United States Patent
Schieler et al.

(10) Patent No.: US 11,283,133 B2
(45) Date of Patent: Mar. 22, 2022

(54) BATTERY HOUSING TO HOLD A BATTERY MODULE, BATTERY MODULE ARRANGEMENT, MOTOR VEHICLE AND METHOD FOR INCORPORATING A THERMALLY CONDUCTIVE ELEMENT IN A BATTERY HOUSING

(71) Applicant: AUDI AG, Ingolstadt (DE)

(72) Inventors: Oliver Schieler, Gaimersheim (DE); Markus Thurmeier, Adlkofen (DE); Martin Simon, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 202 days.

(21) Appl. No.: 16/702,828

(22) Filed: Dec. 4, 2019

(65) Prior Publication Data
US 2020/0194757 A1 Jun. 18, 2020

(30) Foreign Application Priority Data
Dec. 17, 2018 (DE) ...................... 10 2018 221 988.5

(51) Int. Cl.
*H01M 50/24* (2021.01)
*H01M 10/613* (2014.01)
(Continued)

(52) U.S. Cl.
CPC ......... *H01M 50/24* (2021.01); *H01M 10/613* (2015.04); *H01M 10/653* (2015.04);
(Continued)

(58) Field of Classification Search
None
See application file for complete search history.

(56) References Cited

U.S. PATENT DOCUMENTS

| 3,110,633 | A | * | 11/1963 | Bachmann | ......... | H01M 10/663 |
| | | | | | | 219/200 |
| 5,670,272 | A | * | 9/1997 | Cheu | .................... | H01M 50/209 |
| | | | | | | 429/162 |

(Continued)

FOREIGN PATENT DOCUMENTS

| DE | 2 238 352 A1 | 5/1973 | |
| DE | 102012222133 A1 * | 6/2014 | ......... H01M 10/647 |

(Continued)

OTHER PUBLICATIONS

German Search Report dated Dec. 13, 2019, in connection with corresponding DE Application No. 10 2018 221 988.5 (14pgs., including machine-generated English translation).

*Primary Examiner* — Gregg Cantelmo
(74) *Attorney, Agent, or Firm* — Maier & Maier, PLLC

(57) ABSTRACT

A battery housing to hold a battery module, wherein the battery housing includes a housing bottom, wherein the housing bottom comprises at least one injection opening, through which a thermally conductive material can be injected by means of an injection device into the battery housing in a first direction through the housing bottom, wherein the battery housing includes an elastically compressible sealing element, which is arranged in the area of the at least one injection opening, and is designed to close the at least one injection opening, wherein the sealing element is designed to open up the injection opening by elastic compression of the sealing element as of a predetermined injection force (Fi) acting in the first direction during the injecting of the thermally conductive material, and to close the injection opening once more by expanding of the sealing element in absence of the injection force (Fi).

14 Claims, 2 Drawing Sheets

(51) Int. Cl.
  *H01M 10/653* (2014.01)
  *H01M 10/6567* (2014.01)
  *H01M 50/293* (2021.01)
  *H01M 50/636* (2021.01)
  *H01M 10/625* (2014.01)
  *H01M 50/249* (2021.01)

(52) U.S. Cl.
  CPC ..... *H01M 10/6567* (2015.04); *H01M 50/293* (2021.01); *H01M 50/636* (2021.01); *H01M 10/625* (2015.04); *H01M 50/249* (2021.01)

(56) References Cited

U.S. PATENT DOCUMENTS

| | | |
|---|---|---|
| 2007/0259258 A1* | 11/2007 | Buck ................ H01M 10/0481 429/120 |
| 2011/0064997 A1 | 3/2011 | Peskar et al. |
| 2012/0183823 A1* | 7/2012 | Von Borck .......... H01M 10/625 429/81 |
| 2014/0377640 A1 | 12/2014 | Takenouchi et al. |
| 2015/0200426 A1* | 7/2015 | Maguire ........... H01M 10/6551 429/120 |

FOREIGN PATENT DOCUMENTS

| | | | | |
|---|---|---|---|---|
| DE | 102013021205 A1 * | 6/2015 | ............ | H01M 50/20 |
| DE | 10 2017 116 420 A1 | 1/2018 | | |
| DE | 102018219732 A1 * | 5/2020 | .......... | H01M 10/653 |
| EP | 3 444 889 A1 | 2/2019 | | |
| WO | 2016/053416 A1 | 4/2016 | | |

* cited by examiner

BATTERY HOUSING TO HOLD A BATTERY MODULE, BATTERY MODULE ARRANGEMENT, MOTOR VEHICLE AND METHOD FOR INCORPORATING A THERMALLY CONDUCTIVE ELEMENT IN A BATTERY HOUSING

FIELD

The disclosure relates to a battery housing to hold a battery module, wherein the battery housing comprises a housing bottom. Furthermore, the invention also relates to a battery module arrangement with such a battery housing, a motor vehicle, as well as a method for incorporating a thermally conductive element in a battery housing in order to hold a battery module.

BACKGROUND

Present-day high-voltage battery storage systems for electric vehicles must meet high demands on the tightness against environmental factors such as moisture, salt load, and so forth. These can only be assured by costly sealing measures. Furthermore, the thermal connection of the cells to a cooling structure is essential to the function of the battery. For this, thermally conductive pastes or thermally conductive elements in general, so-called gap filler or thermal interface materials (TIM) are used. For the incorporation of such a thermally conductive element, the element is applied in the battery housing, especially on the housing bottom, and then the modules are screwed in. This compresses the thermally conductive element and it becomes ideally distributed uniformly on the housing bottom between the bottom and the respective battery modules. A cooling device is then usually arranged underneath on the battery housing bottom. Since battery housings usually have definite irregularities in the bottom and thus large tolerances, the use of such thermally conductive pastes or such thermally conductive elements can improve the heat dissipation from the modules through the paste and the battery housing bottom to the cooling device.

However, this method of incorporating gap fillers or thermally conductive elements in a battery housing has the problem that, due to the practically closed system, the required gap filling or wetting during the setting process cannot be monitored and assured. An undefined emergence of gap filler results in waste of material as well as additional vehicle weight. Furthermore, a uniform distribution is not possible if the bottom is warped. Also, the high flow paths cause high bottom pressures which may result in module damage. Furthermore, high contact pressures during the setting result in soft screw connections for the fastening of the battery modules during the setting. This, in turn, may result in further time-consuming and costly work, since after a certain time the gap filler material will settle somewhat and then the screw connections will become loose.

US 2011/0064997 A1 describes an impact-resistant battery having an increased resistance to fire or explosion caused by the impact of a projectile. For this purpose, the battery has a housing with a self-sealing ionomer material.

Furthermore, WO 2016/053416 A1 describes a battery module with multiple battery cells arranged in a battery housing. In order to enable the removal of water or other fluid from the housing, such as may collect inside the housing, the housing may have small holes, openings, or pressure vents, which open for example under the force of gravity of the liquid collecting on the bottom, so that the water can drain out.

Furthermore, DE 2238352 A1 describes a galvanic cell which consists of a cup provided with a closure lid, carrying on the inside oppositely polarized electrodes, which are surrounded by an organic liquid electrolyte. In order to more easily introduce the electrolyte into the galvanic cell, the closure lid has a pierceable sealing element, allowing an injection of the electrolyte into the cup, which is able to automatically close the injection opening thanks to its natural elasticity.

The desire to eliminate or at least mitigate the problems mentioned above which occur when introducing a thermally conductive paste between a battery housing bottom and the battery modules is still acute.

SUMMARY

The problem which the present invention proposes to solve is therefore to provide a battery housing, a battery module arrangement, a motor vehicle and a method for incorporating a thermally conductive material in a battery housing to hold a battery module which provided the most efficient possible way of incorporating a thermally conductive material in a battery housing.

This problem is solved by a battery housing, by a battery module arrangement, by a motor vehicle and by a method for incorporating a thermally conductive material in a battery housing.

A battery housing according to the invention to hold a battery module comprises a housing bottom, comprising at least one injection opening through which a thermally conductive material can be injected by means of an injection device into the battery housing in a first direction through the housing bottom. Furthermore, the battery housing comprises an elastically compressible sealing element, which is arranged in the area of the at least one injection opening, and is designed to close the at least one injection opening. The sealing element is furthermore designed to open up the injection opening by elastic compression of the sealing element as of a predetermined injection force acting in the first direction during the injecting of the thermally conductive material, and to close the injection opening once more by expanding of the sealing element in absence of the injection force.

Such a battery housing advantageously makes it possible to inject the thermally conductive material from underneath through the housing bottom. Thus, the thermally conductive material can advantageously be injected directly underneath a battery module already located in the battery housing. Advantageously, a plurality of such injection openings can be provided with respective sealing elements. This enables an especially uniform distribution of the thermally conductive material in an especially easy manner. Furthermore, a uniform distribution of the thermally conductive material no longer needs to be done by pressing on the battery modules. Thus, the injection from underneath eliminates the costly module setting and compressing of the gap filler with the described screwing process, requiring further time-consuming and costly work. Furthermore, process time is saved that is caused by the setting of a battery module with simultaneous compressing of the thermally conductive material. Thanks to this much more efficient and uniform application possibility for the thermally conductive material, furthermore especially small gap widths can be advantageously achieved between a battery module and the housing bottom, which means that much less thermally conductive material is required, which in turn can accomplish a cost and weight savings.

This advantageous injection of the thermally conductive material into the battery housing from underneath is now advantageously made possible by the sealing element, which is compressed during the injecting of the thermally conductive material by the injection force or the injection pressure acting on this sealing element during the injecting and thereby opens up the injection opening. After the injection of the thermally conductive material, i.e., when no more thermally conductive material is being injected and therefore also no more injection force or no pressure is acting in the first direction on this sealing element, the sealing element once more expands and thereby automatically closes the injection opening. In this way, advantageously the applied thermally conductive material cannot escape once more from the battery housing, especially through the housing bottom through the at least one injection opening, for example by flowing out. Such an elastically compressible sealing element advantageously makes possible an injection of the thermally conductive material from underneath into the battery housing, resulting in turn in the above described benefits. Thus, furthermore, the invention has the major advantage that such a sealing concept can be realized in a minimal design space, in particular no additional design space is required. In this way, the available design space in the motor vehicle, which ultimately determines the driving range, can be optimally utilized. Furthermore, the sealing element as well as the injection opening can be realized in especially cost-effective manner and the sealing concept moreover requires no control from the outside. The sealing element also closes spontaneously upon interruption of the injection or a pressure drop. Nor is any additional equipment needed for the sealing. On the whole, an especially efficient incorporating of a thermally conductive material in a battery housing is thus made possible.

The injected thermally conductive material can be, for example, a gap filler or a thermal interface material, such as a thermally conductive liquid or also a thermally conductive paste or some other thermally conductive compound. In particular, however, any liquid or paste-like material with good thermal conduction properties can be considered, that is, having a thermal conductivity which is at least higher than that of air. The injection device can be, for example, a kind of syringe or the like, by means of which the thermally conductive material can be injected through the injection opening into the battery housing. In general, however, any given injection device can also be used here for the injecting of the thermally conductive material.

The injecting of the thermally conductive material is done in particular into a gap between the housing bottom and the battery module. Thus, the injection of the thermally conductive material is done preferably when the battery module is already inserted and mounted in the battery housing. The housing bottom may furthermore comprise a first side as well as a second side, opposite the first side, providing an outer wall. The first side then is facing toward the battery module if the battery module has been installed in the battery housing. Accordingly, the first direction runs from the second side, that is, from the outer side of the housing bottom, in the direction of the first side, that is, in the direction of the inside of the battery housing.

Furthermore, the battery housing is preferably oriented during the injection of the thermally conductive material such that the first side of the housing bottom, as defined above, represents a top side of the housing bottom, that is, a side facing away from the ground, and the second side of the housing bottom represents an underside, that is, a side facing toward the ground.

Furthermore, it is advantageous, as mentioned above, for the housing bottom to comprise multiple injection openings and respective associated sealing elements. These injection openings and associated sealing elements may be uniform in configuration. In this way, it is advantageously possible to apply the thermally conductive material through multiple holes in the housing bottom at the same time and to distribute it especially uniformly over the housing bottom and between the housing bottom and the at least one battery module. Furthermore, the battery housing may also be designed to hold multiple battery modules. For example, a specially designated area or compartment may be provided for a respective battery module in the battery housing. In other words, the battery housing may be provided as compartments. It is especially advantageous when the battery housing is designed to hold multiple battery modules for the battery housing or the housing bottom to comprise multiple injection openings, for example, only one or at least one per battery module, as well as respective associated sealing elements.

In another advantageous embodiment of the invention, the sealing element is designed, in the at least partly compressed state in absence of the injection force, to exert a force contrary to the first direction on a region of the housing bottom surrounding the at least one injection opening and to close the injection opening in this way. In other words, the sealing element is at least partly in the compressed state even when no injection force is exerted on the sealing element and thus the sealing element is closing the opening. The sealing element is thus pretensioned and thereby exerts a force, due to this partial compression, on the area of the housing bottom surrounding the injection opening, by which the opening can be closed especially tightly. The sealing element for example can be made from a kind of foam. Furthermore, the sealing element may have a diameter or dimensions which are accordingly larger than those of the injection opening, so that the sealing element in a state closing the injection opening completely covers this injection opening and also lies entirely against a marginal area of the housing bottom entirely surrounding the injection opening and exerts said force in particular on the housing bottom. If the thermally conductive material is injected, an injection force must be applied to the sealing element, which is thus accordingly larger than the force exerted by the sealing element on the housing bottom. In this way, the sealing element is compressed, that is, compressed even more, and the thermally conductive material can flow through the injection opening.

In another advantageous embodiment of the invention, the at least one injection opening has a diameter between 5 mm inclusive and 10 mm inclusive. Precisely in this diameter range sufficient space is provided for injecting a thermally conductive material through the injection opening by means of the injection device and on the other hand to reliably close this injection opening by the sealing element with the least possible expenditure of material when the thermally conductive material is not or no longer being injected.

In another advantageous embodiment of the invention, the battery housing comprises a supporting device, which is situated at a distance from the injection opening, wherein the sealing element is arranged between the supporting device and the at least one injection opening, and wherein the supporting device supports the sealing element when the sealing element is compressed by the injection force. Thus, if the thermally conductive material is being injected through the injection opening, the sealing element is compressed and forced against this supporting device. In this way, the sealing element can advantageously be held in its position.

In order to further stabilize the positioning of the sealing element, it is furthermore especially preferable for the sealing element to be fastened to the supporting device by its side facing away from the at least one injection opening. For example, the sealing element can be glued or otherwise fastened to the supporting device by the side facing away from the injection opening.

It is especially advantageous for the supporting device to be provided by an underside of a battery module, as shall be described further below, since in this way no additional components are needed and design space can be economized.

Furthermore, the invention also relates to a battery module arrangement having a battery housing according to the invention or one of its embodiments and having at least one battery module with at least one battery cell, wherein the battery module is arranged in the battery housing.

The benefits described for the battery housing according to the invention and its embodiments apply equally to the battery module arrangement according to the invention.

A battery module thus comprises at least one battery cell. Such a battery cell may be designed for example as a lithium ion cell. Preferably, however, the battery module comprises multiple battery cells, such as a battery cell arrangement in a cell pack.

As already likewise described, the battery housing may also be designed to hold multiple battery modules. For example, the battery housing may comprise multiple chambers, which can optionally be separated from each other by partitions, one respective chamber being designed to hold one battery module. Then one or more injection openings with associated sealing elements can be arranged in a housing bottom associated with a respective one of the chambers.

In an especially preferred embodiment of the battery module arrangement, a bottom of the at least one battery module, which is facing toward the housing bottom, provides the supporting device. In other words, a sealing element associated with an injection opening can thus be fastened to a bottom of the battery module, for example by gluing. Prior to the injecting of the thermally conductive material, the battery module is inserted into the battery housing and fastened, so that the bottom of the battery module has a spacing from the housing bottom which is in particular less than a height of the sealing element in the non-compressed state, and the sealing element located on the bottom of the battery module covers and closes the associated injection opening. Thus, by the fastening of the battery module in the battery housing the sealing element is also prestressed accordingly and thus presses against the region of the housing bottom enclosing the injection opening.

Furthermore, it is preferable for the sealing element in this situation, i.e., in a state closing the injection opening, to have a height, i.e., perpendicular to the housing bottom, which is reduced by around one third of its height in the non-compressed state. In this way, the sealing element is on the one hand sufficiently pretensioned to reliably close the injection opening, especially also after the injection of the thermally conductive material, and at the same time to yield adequately when the thermally conductive material is to be injected through the injection opening, freeing up this opening. If multiple injection openings are provided in the housing bottom underneath the battery module, multiple sealing elements can also be arranged accordingly on the bottom of the battery module.

The invention also relates to a motor vehicle having a battery module arrangement according to the invention or one of its embodiments. The motor vehicle according to the invention is preferably designed as an automobile, especially a passenger car or a truck, or as a passenger bus or motorcycle.

The benefits mentioned for the battery housing according to the invention and its embodiments as well as the benefits mentioned for the battery module according to the invention and its embodiments apply equally to the motor vehicle according to the invention.

Furthermore, the invention also relates to a method for incorporating a thermally conductive material in a battery housing to hold a battery module, wherein the battery housing comprises a housing bottom, comprising at least one injection opening, through which the thermally conductive material can be injected by means of an injection device into the battery housing in a first direction through the housing bottom. The battery housing comprises an elastically compressible sealing element, which is arranged in the area of the at least one injection opening, and which opens up the injection opening by elastic compression of the sealing element as of a predetermined injection force acting in the first direction during the injecting of the thermally conductive material and closes the injection opening once more by expanding of the sealing element in absence of the injection force, especially after the injection of the thermally conductive material.

Here as well, the benefits mentioned for the battery housing according to the invention and its embodiments as well as the benefits mentioned for the battery module according to the invention and its embodiments apply equally to the method according to the invention.

The invention also includes modifications of the method according to the invention having the features already described in connection with the modifications of the battery housing according to the invention and the battery module arrangement according to the invention. For this reason, the corresponding modifications of the method according to the invention are not described here yet again.

The invention also encompasses the combinations of the features of the described embodiments.

BRIEF DESCRIPTION OF THE DRAWINGS

In the following, exemplary embodiments of the invention are described. There are shown.

DETAILED DESCRIPTION

The exemplary embodiments discussed in the following are preferred embodiments of the invention. In the exemplary embodiments, each time the components of the embodiments that are described represent individual features of the invention to be considered independently of each other, which also modify the invention each time independently of each other. Therefore, the disclosure will also encompass combinations of features of the embodiments other than those represented. Furthermore, the described embodiments may also be amplified with features of the invention other than those described.

In the figures, the same reference numbers each time pertain to functionally identical elements.

Figure 1:
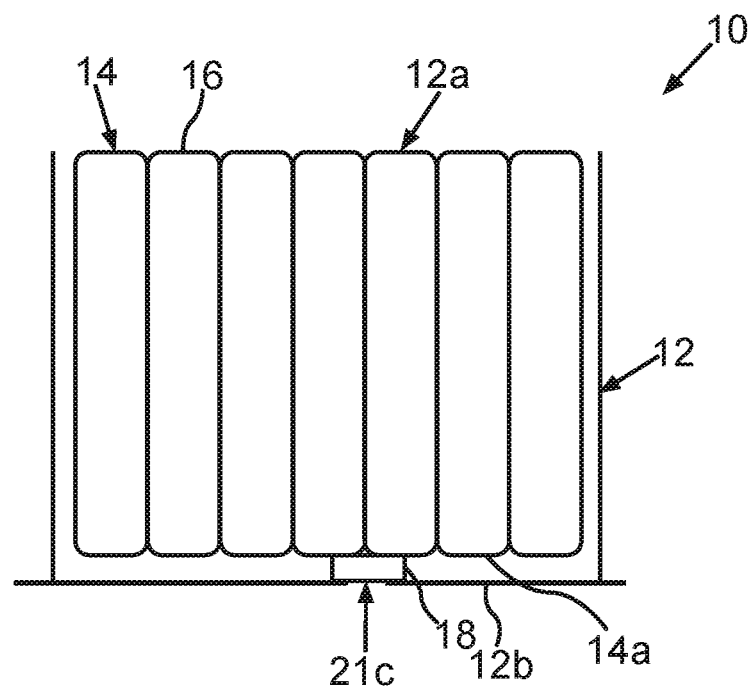
FIG. 1 a schematic representation of a battery housing arrangement having a battery housing and a battery module installed in the battery housing as well as an injection opening for the injection of a thermally conductive material and an associated sealing element closing the injection opening according to one exemplary embodiment of the invention.

FIG. 1 shows a schematic representation of a battery module arrangement 10 having a battery housing 12, of which only a portion is shown here as an example, and a battery module 14, which is inserted into the battery housing 12. The battery module 14 in this example comprises multiple battery cells 16, in particular seven battery cells as an example, of which only one is provided with a reference number for sake of an uncluttered drawing. Furthermore, the battery module 14 is arranged in a chamber 12a of the battery housing 12 associated with this battery module 14. The battery housing 12 may furthermore comprise multiple such chambers 12a for respective battery modules 14. Furthermore, the battery housing 12 comprises a bottom 12b. In this housing bottom 12b there is now at least one injection opening 12c. This injection opening 12c is now advantageously closed by a sealing element 18 situated above it. This sealing element 18 may for example be provided by a foam seal, for example one made of a polyurethane foam or any other suitable foam. In general, the sealing element 18 is elastically compressible. As represented, this sealing element 18 is arranged between the battery module 14 and the housing bottom 12b, in particular between a bottom 14a of the battery module 14 and the housing bottom 12b. For the stabilization of the position of the sealing element 18, especially during the injection of a thermally conductive material and especially also to simplify the installing of the battery modules 14 in the battery housing 12, the sealing element 18 is preferably fastened to the underside 14a or to the bottom 14a of the battery module 14. Thus, before the battery module 14 is installed and for example screwed into the battery housing 12, this sealing element 18, and optionally multiple sealing elements 18, is/are arranged on the bottom 14a of the battery module 14, in particular at predetermined positions, corresponding to the position of the respective injection openings 12c in the state of the battery module 14 installed in the battery housing 12. In other words, in a single step during the production of the module, foam seals or in general the sealing elements 18 are placed in the area of the later injection points, i.e., the injection openings 12c.

Furthermore, this sealing element 18 is preferably slightly larger than a diameter of the injection opening 12c, in order to reliably seal off this opening, especially after introducing the thermally conductive material. Furthermore, it is advantageous for the geometry of the sealing element 18 to be adapted to a geometry of the associated injection opening 12c or for these to be identical. Basically, any given geometry may be considered here, such as triangular, square, rectangular, oval, or also any desired free form geometry, but preferably the opening 12c and the sealing element 18 are round, i.e., circular, since this is especially advantageous in terms of flow dynamics and manufacturing technology, and also the injector 19 described later on preferably comprises an injection cannula or an injection tube with round cross section.

Figure 2:
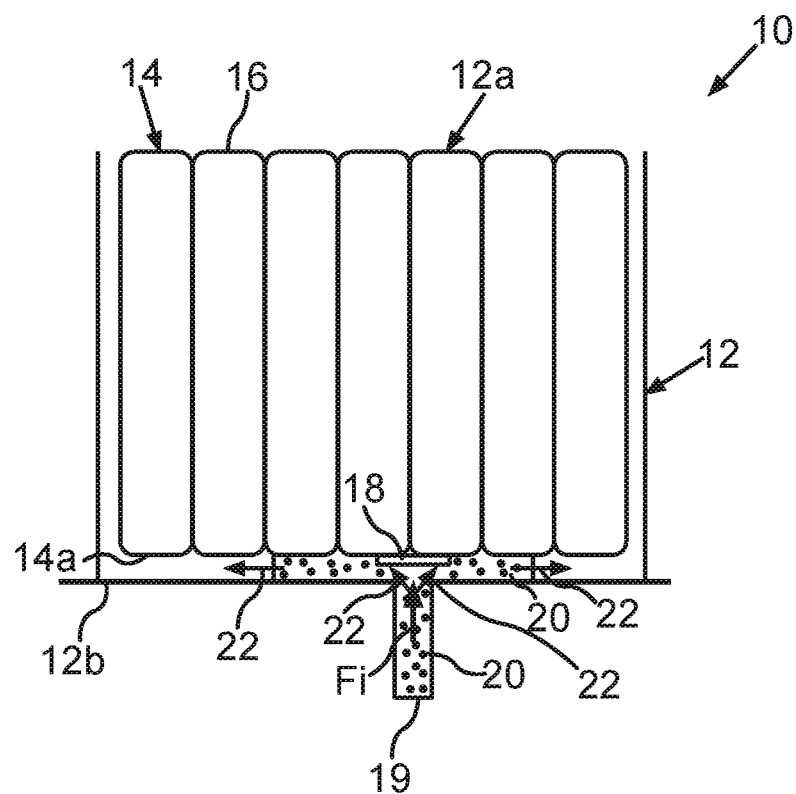
FIG. 2 a schematic representation of the battery module arrangement of FIG. 1 during the injection of the thermally conductive material, wherein the sealing element is compressed and the injection opening is freed up, according to one exemplary embodiment of the invention.

When the battery modules 14 are screwed into the battery housing 12, the foam seals, i.e., the at least one sealing element 18, are slightly compressed and thus given the pre-tensioning needed for their later function. After this, the injection device designed as an injector 19 moves up to the injection points, that is, the at least one injection opening 12c, and commences the injection, as illustrated in FIG. 2. The injector 19 moves up to the at least one injection opening 12c in such a way that it is tightly sealed off with the area of the housing bottom 12b surrounding this opening 12c. At the start of the injection, the injection pressure or the injection force Fi exerted on the sealing element 18 by the thermally conductive material 20 being applied by the injector 19 increases to such an extent that the sealing element 18 is compressed, in particular further compressed, and in this way the injection opening 12c is opened up. The gap filler, i.e., the thermally conductive material 20, flowing into the battery housing 12 compresses the seal, i.e., the sealing element 18. The inflow of the thermally conductive material 20 is illustrated in FIG. 2 by the arrows 22. These arrows 22 furthermore point in the flow direction of the thermally conductive material 20 when the thermally conductive material 20 is injected.

Figure 3:
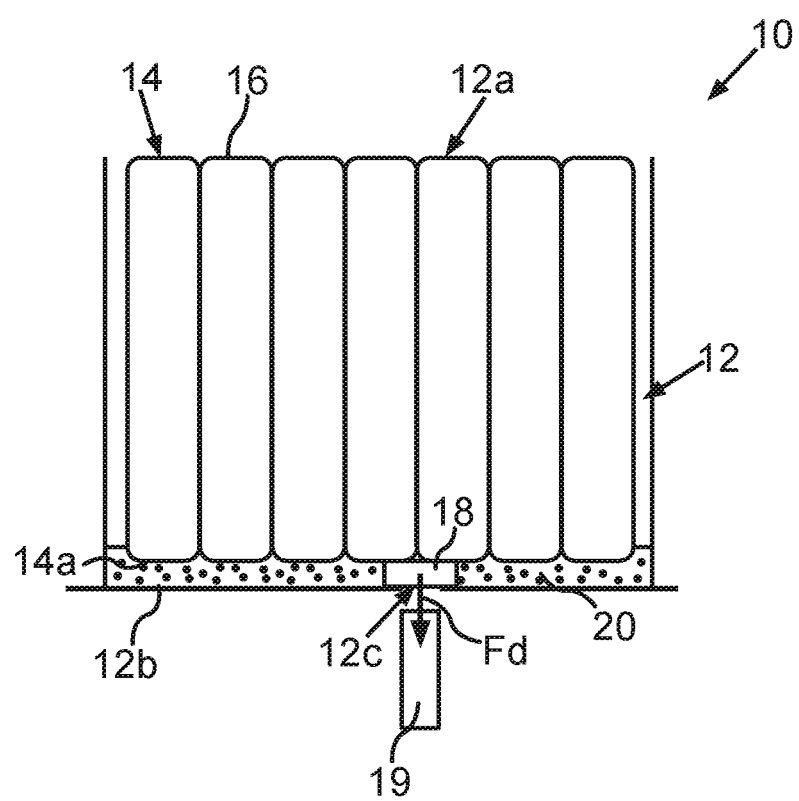
FIG. 3 a schematic representation of the battery module arrangement of FIG. 1 after the injection of the thermally conductive material in the absence of the injection force, so that the sealing element spontaneously closes the injection opening once more by expansion, according to one exemplary embodiment of the invention.

The gap filler or in general the thermally conductive material 20 then flows underneath the battery module 14 for as long as the injection pressure is maintained. In this way, the thermally conductive material 20 can become evenly distributed in the gap between the bottom 14a of the battery module 14 and the housing bottom 12b. This distribution is easier and more even as the viscosity of the thermally conductive material 20 is less. Thanks to a slight viscosity of the thermally conductive material 20, it can also be introduced and distributed much more easily in this gap, so that the pressure needed for this can be significantly lower. This, in turn, is especially advantageous, since high pressures might damage the battery module 14. The use of such a thermally conductive material 20 with especially low viscosity is made possible only by providing the sealing element 18. The injection is then finished, and the injection pressure decreases, and the foam expands back to its original position, that is, the sealing element 18 expands once more, as is shown schematically in FIG. 3. Thus, after the injection, the injector 19 moves back and the seal, i.e., the sealing element 18, expands once more. In this way, the sealing element 18 once again closes the injection hole or the injection opening 12c. The sealing element 18 does not expand fully, but only partly. This is achieved in that the gap width between the module bottom 14a and the housing bottom 12b is smaller than the height of the fully expanded sealing element 18, which in this representation expands parallel to the first direction, i.e., in the direction of the injection force Fi from FIG. 2. In this way, the sealing element 18 is still partly compressed, even after the injection, and thus it exerts a force Fd due to this partial compression on the region of the housing bottom 12b surrounding the associated injection opening 12c. Hence, no gap filler can flow back or emerge from the housing bottom 12b through the injection opening 12c, even with lesser viscosity.

Furthermore, a cooling plate, especially a cooling plate through which a cooling agent flows, can then be arranged on this housing bottom 12b on the underside, that is, on the side of the housing bottom 12b opposite the battery module 14. For example, it may be glued on. Hence, heat from the battery module 14 can now be transferred especially efficiently via the thermally conductive material 20 and the housing bottom 12b to the cooling plate and be transported away.

On the whole, the examples show how a sealing concept according to the invention can be provided for the spontaneous sealing of an injection opening after the injection of a thermally conductive material, especially a gap filler, from underneath into a battery housing, causing minimal costs and no loss of design space, and also advantageously requiring no control from the outside. Upon interruption of the injection or a pressure drop, the seal closes itself spontaneously by expansion. Hence, an especially efficient incorporation of a thermally conductive material between the battery module and a housing bottom can be accomplished. The injection process itself can be made more efficient in this way, and also the time consuming setting of the module, accompanied by a compressing of the gap filler, can be totally eliminated. In this way, process time can be shortened significantly and furthermore significantly smaller gap widths can be achieved, which once again makes it possible to save on gap filler and thus also on weight and costs.

The invention claimed is:

1. A battery housing to hold at least one battery module, comprising:
    a housing bottom,
    wherein the housing bottom comprises at least one injection opening, through which a thermally conductive material is injectable by means of an injection device into the battery housing in a first direction,
    wherein the battery housing comprises at least one elastically compressible sealing element, which is arranged in an area of the at least one injection opening and is designed to close the at least one injection opening,
    wherein the at least one sealing element is designed to open up the at least one injection opening by elastic compression of the at least one sealing element in response to a predetermined injection force (Fi) acting in the first direction during injection of the thermally conductive material, and to close the at least one injection opening once more by expanding of the at least one sealing element in absence of the predetermined injection force (Fi),
    wherein the at least one battery module comprises at least one battery cell and the at least one battery module is arranged in the battery housing, and
    wherein the thermally conductive material is injected through the at least one injection opening so as to fill a space between the at least one battery module and the housing bottom, the thermally conductive material contacting both and thereby thermally bridging the at least one battery module and the housing bottom.

2. The battery housing according to claim 1, wherein the housing bottom comprises multiple injection openings and the battery housing comprises multiple elastically compressible sealing elements.

3. The battery housing according to claim 1, wherein the at least one sealing element is designed, in an at least partly compressed state in absence of the predetermined injection force (Fi), to exert a force (Fd) contrary to the first direction on a region of the housing bottom surrounding the at least one injection opening, thereby closing the at least one injection opening.

4. The battery housing according to claim 1, wherein the at least one injection opening has a diameter between 5 mm inclusive and 10 mm inclusive.

5. The battery housing according to claim 1, wherein the battery housing comprises a supporting device, which is situated at a distance from the at least one injection opening, wherein the at least one sealing element is arranged between the supporting device and the at least one injection opening, and wherein the supporting device supports the at least one sealing element when the at least one sealing element is compressed by the predetermined injection force (Fi).

6. The battery housing according to claim 5, wherein the at least one sealing element is fastened to the supporting device on a side of the at least one sealing element facing away from the at least one injection opening.

7. The battery housing according to claim 1, wherein a bottom of the at least one battery module, which is facing toward the housing bottom, provides a supporting device, which is situated at a distance from the at least one injection opening, wherein the at least one sealing element is arranged between the supporting device and the at least one injection opening, and wherein the supporting device supports the at least one sealing element when the at least one sealing element is compressed by the predetermined injection force (Fi).

8. The battery housing according to claim 2, wherein the at least one sealing element is designed, in an at least partly compressed state in absence of the predetermined injection force (Fi), to exert a force (Fd) contrary to the first direction on a region of the housing bottom surrounding the at least one injection opening, thereby closing the at least one injection opening.

9. The battery housing according to claim 2, wherein the at least one injection opening has a diameter between 5 mm inclusive and 10 mm inclusive.

10. The battery housing according to claim 3, wherein the at least one injection opening has a diameter between 5 mm inclusive and 10 mm inclusive.

11. The battery housing according to claim 2, wherein the battery housing comprises a supporting device, which is situated at a distance from the at least one injection opening, wherein the at least one sealing element is arranged between the supporting device and the at least one injection opening, and wherein the supporting device supports the at least one sealing element when the at least one sealing element is compressed by the predetermined injection force (Fi).

12. The battery housing according to claim 3, wherein the battery housing comprises a supporting device, which is situated at a distance from the at least one injection opening, wherein the at least one sealing element is arranged between the supporting device and the at least one injection opening, and wherein the supporting device supports the at least one sealing element when the at least one sealing element is compressed by the predetermined injection force (Fi).

13. The battery housing according to claim 4, wherein the battery housing comprises a supporting device, which is situated at a distance from the at least one injection opening, wherein the at least one sealing element is arranged between the supporting device and the at least one injection opening, and wherein the supporting device supports the at least one sealing element when the at least one sealing element is compressed by the predetermined injection force (Fi).

14. A method for incorporating a thermally conductive material in a battery housing holding at least one battery module, comprising:

injecting a thermally conductive material through at least one injection opening provided in a housing bottom of the battery housing, wherein the thermally conductive material is injected by means of an injection device, wherein the battery housing comprises at least one elastically compressible sealing element, which is arranged in an area of the at least one injection opening, wherein the at least one sealing element is designed to open the at least one injection opening by elastic compression of the at least one sealing element in response to a predetermined injection force (Fi) acting in a first direction during injection of the thermally conductive material, and to close the at least one injection opening once more by expanding of the at least one sealing element in absence of the predetermined injection force (Fi), wherein the at least one battery module comprises at least one battery cell and the at least one battery module is arranged in the battery housing, and wherein the thermally conductive material is injected through the at least one injection opening so as to fill a space between the at least one battery module and the housing bottom, the thermally conductive material contacting both and thereby thermally bridging the at least one battery module and the housing bottom.

* * * * *